(12) United States Patent
Park et al.

(10) Patent No.: US 10,958,380 B2
(45) Date of Patent: Mar. 23, 2021

(54) METHOD OF TRANSMITTING AND RECEIVING DATA CHANNEL FOR NEW RADIO AND APPARATUS USING THE SAME

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 43 days.

(21) Appl. No.: 15/951,349

(22) Filed: Apr. 12, 2018

(65) Prior Publication Data
US 2018/0302191 A1   Oct. 18, 2018

(30) Foreign Application Priority Data

Apr. 12, 2017 (KR) .......... 10-2017-0047545
May 2, 2017 (KR) .......... 10-2017-0056477
Jul. 6, 2017 (KR) .......... 10-2017-0086107
Mar. 27, 2018 (KR) .......... 10-2018-0034955

(51) Int. Cl.
| | |
|---|---|
| *H04L 1/00* | (2006.01) |
| *H04L 1/16* | (2006.01) |
| *H04L 1/18* | (2006.01) |
| *H04L 5/00* | (2006.01) |
| *H04W 28/04* | (2009.01) |
| *H04W 72/04* | (2009.01) |
| *H04W 72/12* | (2009.01) |

(52) U.S. Cl.
CPC .......... *H04L 1/1614* (2013.01); *H04L 1/1812* (2013.01); *H04L 1/1896* (2013.01); *H04L 5/0053* (2013.01); *H04L 5/0055* (2013.01); *H04W 28/04* (2013.01); *H04W 72/042* (2013.01); *H04L 1/0023* (2013.01); *H04W 72/1289* (2013.01)

(58) Field of Classification Search
None
See application file for complete search history.

(56) References Cited

U.S. PATENT DOCUMENTS

| | | | | |
|---|---|---|---|---|
| 2018/0145797 | A1* | 5/2018 | Yeo | H04L 1/1812 |
| 2018/0278368 | A1* | 9/2018 | Kim | H04L 5/0094 |
| 2019/0181986 | A1* | 6/2019 | Kitamura | H04L 1/16 |
| 2019/0191486 | A1* | 6/2019 | Myung | H04W 80/08 |
| 2019/0207734 | A1* | 7/2019 | Yang | H04L 1/1819 |

(Continued)

OTHER PUBLICATIONS

U.S. Appl. No. 62/566,339, filed Sep. 30, 2017.
(Continued)

*Primary Examiner* — Ajit Patel
*Assistant Examiner* — Liem H. Nguyen
(74) *Attorney, Agent, or Firm* — IP Legal Services, LLC (57) ABSTRACT

Provided is a method of transmitting and receiving a data channel for the next-generation/5G radio access network. The method may include: receiving setting information about a code block group (CBG) for retransmission of the data channel from a base station; and receiving downlink control information (DCI) including scheduling information about the data channel from the base station, wherein the DCI includes transmission direction information about the CBG.

13 Claims, 5 Drawing Sheets

(56) References Cited

U.S. PATENT DOCUMENTS

2019/0327759 A1\* 10/2019 Lee ...................... H04L 5/0053
2020/0100139 A1\* 3/2020 Kim ...................... H04L 1/1614
2020/0106584 A1\* 4/2020 Jiang ...................... H04J 13/16
2020/0195386 A1\* 6/2020 Marinier ............... H04L 1/1845

OTHER PUBLICATIONS

U.S. Appl. No. 62/520,562, filed Jun. 16, 2017.
U.S. Appl. No. 62/501,048, filed May 3, 2017.
U.S. Appl. No. 62/475,860, filed Mar. 23, 2017.
U.S. Appl. No. 62/469,546, filed Mar. 10, 2017.
U.S. Appl. No. 62/468,380, filed Mar. 8, 2017.

\* cited by examiner

METHOD OF TRANSMITTING AND RECEIVING DATA CHANNEL FOR NEW RADIO AND APPARATUS USING THE SAME

CROSS REFERENCE TO RELATED APPLICATION

This application claims priority from Korean Patent Applications No. 10-2017-0047545, filed on Apr. 12, 2017, No. 10-2017-0056477, filed on May 2, 2017, No. 10-2017-0086107, filed on Jul. 6, 2017, & No. 10-2018-0034955, filed on Mar. 27, 2018 which are hereby incorporated by reference for all purposes as if fully set forth herein.

BACKGROUND OF THE INVENTION

1. Field of the Invention

The present disclosure proposes to a method of transmitting and receiving a data channel for a next-generation/5G radio access network (hereinafter, referred to as a new radio (NR)).

2. Description of the Prior Art

Recently, a radio access network working group 1 (RAN WG1) has been discussing frame structures, channel coding and modulation, waveforms, and multiple access methods for a new radio (NR), and the $3^{rd}$ generation partnership project (3GPP) has approved a study item "Study on New Radio Access Technology" for research on next-generation/5G radio access technology based on the discussion of the RAN WG1. It is required to design NR not only to provide a data transmission rate improved as compared with that of long term evolution (LTE)/LTE-Advanced, but also to satisfy various requirements in detailed and specific usage scenarios.

An enhanced mobile broadBand (eMBB), massive machine-type communication (mMTC), and ultra reliable and low latency communication (URLLC) are proposed as typical usage scenarios for the NR. In order to meet the requirements of the individual scenarios, it is required to design flexible frame structures when compared to those of LTE/LTE-Advanced.

In particular, when retransmission is required for a data channel (e.g., physical downlink shared channel (PDSCH)/physical uplink shared channel (PUSCH)) of the NR, it is necessary to develop a more efficient retransmission method to save resources necessary for the retransmission unlike the LTE where the retransmission is performed in units of transmission block (TB).

SUMMARY OF THE INVENTION

Aspects of embodiments are directed to providing a code block group (CBG)-based retransmission method in a process of transmitting and receiving a data channel (physical downlink shared channel (PDSCH)/physical uplink shared channel (PUSCH)) for next-generation/5G radio access network.

To solve the foregoing problem, in accordance with an embodiment, a method may be provided for transmitting and receiving a data channel by a terminal. The method may include: receiving setting information about the CBG for retransmission of the data channel from a base station; and receiving downlink control information (DCI) comprising scheduling information about the data channel from the base station, wherein the DCI comprises transmission direction information about the CBG.

In accordance with another embodiment, a method may be provided for transmitting and receiving the data channel by a base station. The method may include: transmitting setting information about the CBG for retransmission of the data channel to the terminal; and transmitting DCI comprising scheduling information about the data channel to the terminal, wherein the DCI comprises transmission direction information about the CBG.

In accordance with still another embodiment, a terminal may be provided for transmitting and receiving the data channel. The terminal may include a receiver configured to receive setting information about the CBG for retransmission of the data channel from a base station, and receive DCI comprising scheduling information about the data channel from the base station, wherein the DCI comprises transmission direction information about the CBG.

In accordance with yet another embodiment, a base station may be provided for transmitting and receiving the data channel. The base station may include a transmitter configured to transmit setting information about the CBG for retransmission of the data channel to the terminal, and transmit DCI comprising scheduling information about the data channel to the terminal, wherein the DCI comprises transmission direction information about the CBG.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements may be designated by the same reference numerals although the same elements are shown in different drawings. Further, in the following description of the present disclosure, detailed descriptions of functions and configurations related to the known structure may be omitted when it is determined that the descriptions may obscure the gist of the present disclosure.

In the present disclosure, a wireless communication system refers to a system for providing various communication services such as a voice service, a packet data service, etc. The wireless communication system may include a user equipment (UE) and a base station (BS).

The UE may be a comprehensive concept that indicates a terminal for use in wireless communication, including a UE used for wideband code division multiple access (WCDMA), long term evolution (LTE), high speed packet access (HSPA), international mobile telecommunication (IMT)-2020 (5G or new radio), or the like, and a mobile station (MS), a user terminal (UT), a subscriber station (SS), a wireless device, or the like used for a global system for mobile communications (GSM).

The BS or a cell generally refers to a station where communication with a UE is performed, and the BS (e.g., the cell) inclusively means all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the above-described various cells has a BS that controls a corresponding cell, and thus, the BS may be construed in two ways. 1) The BS may be a device itself that provides the megacell, the macrocell, the microcell, the picocell, the femtocell, and the small cell in association with a wireless area, or 2) the BS may indicate the wireless area itself. In item 1), any device that interacts with another device to enable the device that provides a predetermined wireless area to be controlled by an identical entity or to cooperatively configure the wireless area, may be indicated as the BS. Based on a configuration type of the wireless area, a point, a transmission/reception point, a transmission point, a reception point, or the like may be an embodiment of the BS. In item 2), the wireless area itself that receives or transmits a signal from a perspective of the terminal or a neighboring BS, may be indicated as the BS.

In the present disclosure, the cell may refer to the coverage of a signal transmitted from the transmission/reception point, a component carrier having the coverage of the signal transmitted from the transmission/reception point (transmission point or transmission/reception point), or the transmission/reception point itself.

In the present disclosure, the user equipment and the BS are used as two (uplink and downlink) inclusive transceiving subjects to embody the technology and technical concepts described in the specifications. However, embodiments may not be limited to a specific term or word.

Here, an uplink (UL) refers to a scheme for the UE to transceive data to the BS, and a downlink (DL) refers to a scheme for the BS to transceive data to the UE.

UL transmission and DL transmission may be performed using one of i) a time division duplex (TDD) scheme that performs transmission based on different times, ii) a frequency division duplex (FDD) scheme that performs transmission based on different frequencies, and iii) a mixed scheme of the TDD and FDD schemes.

Further, in the wireless communication system, a standard may be developed by forming an UL and a DL based on a single carrier or a pair of carriers.

The UL and the DL may transmit control information through a control channel, such as a physical DL control channel (PDCCH), physical UL control channel (PUCCH), and the like, and the UL and the DL may be configured as a data channel, such as physical DL shared channel (PDSCH), physical UL shared channel (PUSCH), and the like, to transmit data.

The DL may refer to communication or a communication path from a multi-transmission/reception point to the terminal, and the UL may refer to communication or the communication path from the terminal to a multi-transmission/reception point. In the DL, a transmitter may be a part of multiple transmission/reception points and a receiver may be a part of the terminal. In the UL, a transmitter may be a part of the terminal and a receiver may be a part of multiple transmission/reception points.

Hereinafter, a situation, in which signals are transmitted and received through a channel such as the PUCCH, the PUSCH, the PDCCH, or the PDSCH, will be expressed as the transmission and reception of the PUCCH, the PUSCH, the PDCCH, or the PDSCH.

Meanwhile, higher layer signaling includes a radio resource control (RRC) signaling that transmits RRC information including an RRC parameter.

The BS performs DL transmission on the terminals. The BS may transmit a physical DL control channel for transmitting DL control information such as scheduling required to receive a DL data channel that is a main physical channel for unicast transmission, and scheduling approval information for transmission on an UL data channel. Hereinafter, transmission and reception of a signal through each channel will be described as transmission and reception of a corresponding channel.

Varied multiple access schemes may be unrestrictedly applied to the wireless communication system. Various multiple access schemes, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, and the like may be used. Here, NOMA includes sparse code multiple access (SCMA), low cost spreading (LDS), and the like.

Embodiment of the present disclosure may be applicable to resource allocation in an asynchronous wireless communication scheme that evolves into LTE/LTE-advanced and IMT-2020 through GSM, WCDMA, and HSPA, and the embodiments may be applicable to resource allocation in a synchronous wireless communication scheme that evolves into CDMA, CDMA-2000, and UMB.

In the present disclosure, a machine type communication (MTC) terminal refers to i) a terminal that is low cost (or low complexity) or ii) a terminal that supports coverage enhancement. Alternatively, in the present disclosure, the MTC terminal refers to a terminal that is defined as a predetermined category for maintaining low costs (or low complexity) and/or coverage enhancement.

In other words, in the present specifications, the MTC terminal may refer to a newly defined 3GPP Release-13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type. Alternatively, the MTC terminal may refer to a further Enhanced MTC terminal defined in Release-14.

In the present disclosure, a narrowband Internet of Things (NB-IoT) terminal refers to a terminal supporting radio access for cellular IoT. NB-IoT technology are aimed at indoor coverage improvement, support for large-scale low-speed terminals, low latency sensitivity, very low terminal costs, low power consumption, and optimized network architecture.

An enhanced mobile broadband (eMBB), massive machine-type communication (mMTC), and ultra reliable and low latency communication (URLLC) are proposed as typical usage scenarios for new radio (NR) which has been under discussion in the 3GPP in recent years.

In the present disclosure, a frequency, a frame, a sub-frame, a resource, a resource block, a region, a band, a sub-band, a control channel, a data channel, a synchronization signal, various reference signals, various signals, and various messages associated with NR may be interpreted as meanings used in the past or present or as various meanings to be used in the future.

NR

Recently, the 3GPP has approved the study item "Study on New Radio Access Technology" for research on next-generation/5G radio access technology, based on discussions about frame structure, channel coding & modulation, waveform, multiple access scheme, etc.

It is required to design NR not only to provide a data transmission rate improved as compared with that of LTE/LTE-Advanced, but also to satisfy various requirements in detailed and specific usage scenarios. In particular, an eMBB, mMTC, and URLLC have been given as representative usage scenarios of the NR, and it has been required to design flexible frame structures as compared with those for LTE/LTE-Advanced in order to satisfy the requirements of each individual scenario.

Specifically, the eMBB, mMTC and URLLC have been taken into account as the representative usage scenario of the NR being discussed in the 3GPP. Since the usage scenarios are different in requirements for data rates, latency, coverage, etc. from one another, a method of efficiently multiplexing radio resource units based on different kinds of numerology (e.g., a subcarrier spacing (SCS), a subframe, a transmission time interval (TTI), etc.) has been proposed as a method of efficiently satisfying requirements according to usage scenarios through a frequency band of a certain NR system.

To this end, there have been discussions on a method of multiplexing and supporting the numerology having different values of SCS based on TDM, FDM or TDM/FDM through one NR carrier, and a method of supporting one or more time units in forming scheduling units in a time domain. In this regard, the NR has defined i) a subframe as one kind of time domain structure and ii) a single subframe duration configured with 14 OFDM symbols of 15 kHz SCS-based normal CP overhead like the LTE as reference numerology to define the corresponding subframe duration. Therefore, the subframe in the NR has a time duration of 1 ms. However, unlike the LTE, the subframe of the NR may have a slot and a mini-slot defined as an actual UL/DL data scheduling-based time unit, which is an absolute reference time duration. In this case, the number of OFDM symbols for forming the corresponding slot, i.e., a value of y has been defined as y=14 regardless of the numerology.

Therefore, a certain slot may include 14 symbols. In accordance with transmission directions for the corresponding slot, any of the symbols may be used for DL (DL) transmission or UL (UL) transmission, or the symbols may be used in the form of a DL portion+a gap+an UL portion.

Further, a mini-slot may be configured with fewer symbols than those of the corresponding slot. Such a mini-slot may be defined in certain numerology (or SCS), and a short time domain scheduling interval for transmitting and receiving UL/DL data may be set based on the mini-slot. Besides, a long time domain scheduling interval for transmitting and receiving UL/DL data may be configured by slot aggregation.

Particularly, in case of transmitting and receiving latency critical data like the URLLC, when the scheduling is performed in units of slots based on 0.5 ms (7 symbols) or 1 ms (14 symbols) defined in a frame structure based on the numerology having a small SCS value like 15 kHz, the scheduling may be difficult to satisfy latency requirements. To this end, the mini-slot is defined to have fewer OFDM symbols than those of the corresponding slot. Thus, the scheduling for the latency critical data like the URLLC is achieved based on the mini-slot.

Figure 1:
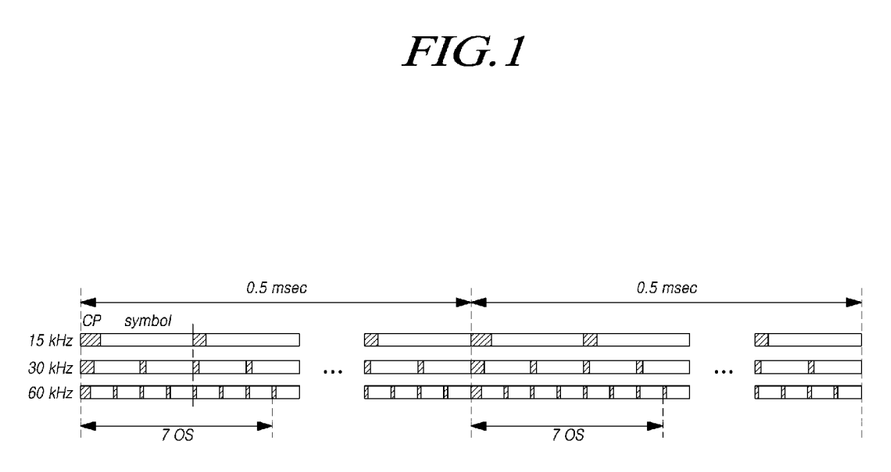
FIG. 1 illustrates arrangements of orthogonal frequency division multiple (OFDM) symbols when subcarrier spacings, which are different from each other, are used according to embodiments.

Further, as described above, there has been consideration on a method of scheduling data in accordance with latency requirements based on the length of the slot (or mini-slot) defined in each individual numerology by using the TDM or FDM method to multiplex and support the numerology having different SCS values within one NR carrier. For example, as shown in FIG. 1, the length of symbol for 60 kHz SCS is shortened by a fourth than that for 15 kHz SCS, and thus a 60 kHz-based slot is shortened to have a length of about 0.125 ms as compared with a 15 kHz-based slot having a length of 0.5 ms under the same condition that one slot is configured with seven OFDM symbols.

As described above, a method of satisfying each requirement of URLLC and eMBB has been under discussion by defining different SCS or different TTI length in the NR.

Configuration of TB, CB, and CBG for NR PDSCH/PUSCH

In the typical LTE system, a transport block size (TBS) of a transport block (TB) to be transmitted through a PDSCH/PUSCH is determined by information about assignment of a modulation and coding scheme (MCS) and resource block (RB) when PDSCH/PUSCH resources are assigned for transmitting certain DL/UL data. After the TBS is determined, the TB is segmented into a plurality of code block (CB) in accordance with a maximum CB size to be encoded. Then, a CRC is attached in units of CB, and the CBs are encoded and interleaved with assigned PDSCH/PUSCH resources, thereby mapping with PDSCH/PUSCH resources. On the other hand, an HARQ ACK/NACK feedback for a certain PDSCH/PUSCH and retransmission based on the feedback are achieved in units of TB.

In the NR, particularly, in the case of eMBB, support for a TBS larger than that of the LTE is required, and therefore the number of CBs forming one TB may be rapidly increased in accordance with definitions of the maximum CB size. Accordingly, it is highly necessary to further subdivide the HARQ ACK/NACK feedback for one TB and the unit of retransmission, and there is a need of grouping one or more CBs into a code block group (CBG) and performing the HARQ ACK/NACK feedback and the retransmission based on the CBG.

The embodiments set forth herein may even be applied to a terminal, a BS and a core network entity (or mobility management entity (MME) which employs all mobile communication technologies). For example, the embodiments may be applied to a next-generation mobile communication (5G mobile communication or New-RAT) terminal, a BS and a core network entity (access and mobility function (AMF)) as well as a mobile communication terminal employing the LTE technology. For convenience of description, the BS may refer to an eNB of LTE/E-UTRAN, or the BS may refer to a gNB, and a BS (i.e., a central unit (CU), a distributed unit (DU), or the CU and the DU are provided as a logical entity) in the 5G radio network where the CU and the DU are separated.

Further, the numerology described in this specification refers to a numerical characteristic and a numerical value about data transmission/reception, and the numerology may be determined by a value of subcarrier spacing (hereinafter, referred to as 'SCS'). Therefore, the numerology being different may indicate that the SCS of determining the numerology is different.

In addition, a slot length in this specification may be represented by the number of OFDM symbols forming a slot or by a time occupied with the slot. For example, when the numerology based on the SCS of 15 kHz is used, the length of one slot may be represented by 14 OFDM symbols or by 1 ms.

Further, the data channel in this specification may refer to a downlink data channel (or a PDSCH) or an uplink data channel (or a PUSCH). In this regard, a method of transmitting and receiving a data channel may refer to a method that a terminal receives the downlink data channel, i.e., PDSCH, from the BS or a method that the terminal transmits the UL data channel, i.e., PUSCH, to the BS.

Below, the method of transmitting and receiving the data channel between the terminal and the BS will be described in more detail through various embodiments.

The embodiments set forth herein may be applied individually or with a combination thereof.

Embodiment 1. CBC-Based Retransmission Method in DL Data Transmission

In accordance with the this embodiment, a detailed configuration of DL control information and a transmission and reception method may be provided for performing CBG-based retransmission when a CBG-based HARQ operation is applied as described above.

For convenience of description, the present disclosure is based on the premise that initial PDSCH transmission includes N CBGs with regard to a predetermined HARQ process number (or HARQ process ID). However, it will be appreciated that this embodiment may be applied regardless of the number of CBGs configured at the initial PDSCH transmission, a concrete value of N, or a detailed method of setting N.

Embodiment 1-1. Method of Directing CBG for Explicit Retransmission

In regard to a predetermined initial PDSCH transmission, when a TB to be transmitted through the PDSCH includes N CBGs (e.g., CBG #0, CBG #1, . . . , CBG #(N−1)) as described above, it may be defined that the terminal transmits HARQ ACK/NACK feedback information for each individual CBG through the PUCCH. When NACK is reported with regard to M CBGs among N CBGs, it may be defined that the BS performs the retransmission for only the M CBGs through the PDSCH.

Specifically, it may be defined that the BS performs the retransmission for the M CBGs, which are failed to be decoded in a terminal, through resource assignment for single PDSCH transmission. In other words, it may be determined that i) the BS transmits a single DL assignment DCI for the retransmission of the M CBGs, and ii) the BS uses the DL assignment DCI to transmit resource assignment information about the single PDSCH transmission for the retransmission of the M CBGs. In this case, a DL assignment DCI format for the retransmission includes explicit direction information about the CBGs to be retransmitted through the PDSCH. Specifically, the DL assignment DCI format for the initial PDSCH transmission and a DL assignment DCI format for separate retransmission are defined to involve the CBG direction information or use some information areas of the existing DL assignment DCI as information areas for the CBG direction.

Alternatively, when the DL assignment DCI format is configured, the CBG-based transmission/retransmission is taken into account, thereby defining an identical DL assignment DCI format between the initial transmission and the retransmission, and applying the identically defined DL assignment DCI format as both the DL assignment DCI format for assigning the initial PDSCH transmission resources and the DL assignment DCI format for the CBG-based PDSCH retransmission.

In this case, as a method of configuring information for instructing the CBG to be retransmitted, bitmap information according to N CBGs configured by the initial PDSCH transmission may be used as the CBG direction information. In other words, it may be defined that a certain NR BS configures the DL assignment DCI format for the retransmission to include a bitmap-based CBG direction information area of N bits, in accordance with the number of CBGs, i.e., a value of N set for PDSCH transmission corresponding to the terminals or configured according to PDSCH transmissions. That is, when NACK is reported by the terminal with regard to the M CBGs (M<=N) from the initial PDSCH transmission for N CBGs as described above, it may be determined that the BS explicitly sets bitmap-based direction information for the CBGs, which will be retransmitted through the PDSCH of the DL assignment DCI, among the M CBGs through the DL assignment DCI for the retransmission, and transmits the set bitmap-based direction information to the corresponding terminal.

Meanwhile, in the DL assignment DCI format for the retransmission, it may be defined that a bitmap configuration for the CBG direction is always based on the number of CBGs, i.e., N, configured for the initial PDSCH transmission with regard to the HARQ process number, or a bitmap information area for the CBG direction is configured depending on the number of CBGs for the previous PDSCH (re)transmission in the case of a second retransmission, a third retransmission, and the like following a first retransmission. In other words, when NACK is reported again with regard to L CBGs (L<=M) among the M CBGs retransmitted at the first retransmission in the above example, it may be defined that a bitmap for configuring the CBG direction information of the DL assignment DCI for retransmitting the L CBGs is configured with M bits corresponding to the value of M, i.e., the number of CBGs transmitted at the previous PDSCH retransmission.

However, as described above, in terms of configuring a certain DL assignment DCI format, when the DL assignment DCI format for assigning PDSCH resources at the initial PDSCH transmission and the DL assignment DCI format for assigning PDSCH resources at the CBG-based retransmission are identically defined in accordance with the number of CBGs, i.e., N, defined for the PDSCH retransmission of the terminal, the bitmap information area configured with N bits corresponding to the number of CBGs, i.e., N, is included in not only the DL assignment DCI format having the PDSCH resource assignment information at the CBG-based retransmission but also the DL assignment DCI format for resource assignment at the initial PDSCH transmission resource. In this case, to assign the resources for the initial PDSCH transmission, it may be defined that the BS sets and transmits a bitmap information area of N bits having the DL assignment DCI format for the resource assignment into a specific value (e.g., all of 'zero' or all of '1').

As another method of identically defining the DL assignment DCI format for the initial PDSCH transmission and the DL assignment DCI format for the retransmission, it may be defined that the size of the CBG direction information area of the DL assignment DCI of a certain terminal (i.e., the number of bits (or a Q value)) is set in the bitmap information area for the CBG direction when the CBG-based (re)transmission is set with regard to the PDSCH for the certain terminal in the BS/network, and then transmitted to the terminal through a terminal or UE-specific or cell-specific higher layer signaling. It may be defined that the terminal always receives the DL assignment DCI format including the CBG direction information area configured with a bitmap of Q bits regardless of the initial PDSCH transmission or the retransmission with regard to a certain HARQ process number.

However, when the CBG-based (re)transmission is set by the BS/network with regard to the PDSCH of the certain terminal, the size of HARQ ACK/NACK feedback information (e.g., the number of HARQ ACK/NACK feedback bits) may be determined through the PUCCH or PUSCH of the corresponding terminal in accordance with the bitmap size, i.e., Q, of the CBG direction information area set through the terminal UE-specific or cell-specific higher layer signaling. Like this, when the size of the CBG direction information area of the DL assignment DCI for a certain terminal is set by the BS/network through the terminal UE-specific or cell-specific higher-layer signaling at setting the CBG-based PDSCH (re)transmission with regard to the terminal, the number of CBGs, i.e., N CBGs, configuring the TB transmitted through a certain PDSCH for the terminal may be directed through the CBG direction information area included in the DL assignment DCI of transmitting the resource assignment information for the initial transmission of the PDSCH.

In other words, unlike the method where the size of bitmap for the CBG direction included in the DL assignment DCI for the terminal is determined in accordance with the already determined number of CBGs (i.e., the value of N as described above), it may be determined that the bitmap size (i.e., the Q value) of the CBG direction information area to be included in the DL assignment DCI is set through the terminal UE-specific or cell-specific higher-layer signaling in the BS/network. It may be determined that the number of CBGs or N CBGs configuring the TB transmitted through the PDSCH (i.e., certain PDSCH transmission for the terminal) is set through the bitmap information area for the CBG direction included in the DL assignment DCI for the initial PDSCH transmission.

Specifically, as a mapping method between the CBGs configuring the TB transmitted through a certain PDSCH and a bitmap configuring the CBG direction information area included in the DL assignment DCI having the PDSCH (re)transmission resource assignment information, it may be defined that the CBG configuring the TB from the lowest CBG index is sequentially one-to-one mapped to the bitmap configuring the CBG direction information area from the least significant bit (LSB) to the most significant bit (MSB).

Further, when a bitmap configuring the CBG direction information area of the DL assignment DCI is set in the BS/network, it may be defined that the CBG transmitted through the PDSCH assigned by the DL assignment DCI is indicated with '1' but the CBG not transmitted is indicated with '0'. In this case, in terms of setting the bitmap configuring the CBG direction information area of the DL assignment DCI for assigning the initial PDSCH transmission resource to a certain TB, i.e., the DL assignment DCI for the initial PDSCH transmission with regard to a certain HARQ process number, when the number of CBGs for the TB is desired to be directed to N in the BS/network, it may be defined that successive N bits from the LSB of the CBG direction bitmap are set to '1' and other bits are set to '0'. Therefore, it may be defined that the terminal groups (TBs) transmitted through the initial PDSCH transmission of the HARQ process may be numbered into N CBGs of CBG #0 to CBG #(N−1).

On the other hand, as a mapping method between the CBG configuring the TB transmitted through a certain PDSCH and the CBG direction bitmap included in the DL assignment DCI, it may be defined that the CBG configuring the TB from the lowest CBG index is sequentially one-to-one mapped to the bitmap configuring the CBG direction information area from the MSB to the LSB. In this case, in terms of setting the bitmap configuring the CBG direction information area of the DL assignment DCI for assigning the initial PDSCH transmission resource to a certain TB, i.e., the DL assignment DCI for the initial PDSCH transmission with regard to a certain HARQ process number, when the number of CBGs for the TB is desired to be directed to N in the BS/network, it may be defined that successive N bits from the MSB of the CBG direction bitmap are set to '1' and the other bits are set to '0'. Therefore, it may be defined that the TBs transmitted through the initial PDSCH transmission of the HARQ process may be numbered into N CBGs of CBG #0 to CBG #(N−1).

For example, when the size of the bitmap for the CBG direction is set to Q bits through the foregoing terminal UE-specific or cell-specific higher-layer signaling, it may be defined that the number of CBGs configuring the TB, i.e., the value of N (where, N Q) is determined in accordance with the number of bits successively set to '1' from the LSB or MSB in the bitmap of Q bits for directing the CBG included in the DL assignment DCI for assigning the resources of the initial PDSCH transmission for the terminal.

On the other hand, in terms of setting the bitmap configuring the CBG direction information area of the DL assignment DCI in the BS/network, when it is defined that the CBG transmitted through the PDSCH assigned by the DL assignment DCI is indicated with '0' and the CBG not transmitted is indicated with 1', it may be defined that the number of CBGs configuring the TB, i.e., the value of N (where, N<=Q) is determined in accordance with the number of bits successively set to '0' from the LSB or MSB in the bitmap of Q bits for directing the CBG included in the DL assignment DCI for assigning the resources of the initial PDSCH transmission for the terminal. In this case, when the CBG-based PDSCH retransmission is directed with regard to the TB (i.e., when the DL assignment DCI of directing the retransmission of the TB is transmitted by the BS/network), it may be defined that only successive N bits from the LSB or MSB of the CBG direction bitmap based on N, which is the number of CBGs configuring the TB directed at the initial PDSCH transmission, are analyzed as significant retransmission CBG direction information in terms of analyzing the CBG direction bitmap information area of Q bits included in the DL assignment DCI by the terminal.

Further, it may be defined that the retransmission is performed by separate PDSCH assignment according to the CBGs. In other words, when the retransmission is required for the M CBGs among N CBGs configured through the initial PDSCH transmission, the PDSCH resource assignment may be separately performed for the retransmission corresponding to each individual CBG. In this case, it may be defined that the DL assignment DCI for the retransmission corresponding to each individual CBG includes direction information about a single CBG to be retransmitted through the PDSCH assigned by the DL assignment DCI. The CBG direction information may be CBG index information corresponding to the number of CBGs configured through the initial PDSCH transmission. In other words, when the initial PDSCH transmission involves N CBGs with regard to the certain HARQ process number of the foregoing example, each CBG may be indexed with CBG #0 to #(N−1), and thus the BS assigns the PDSCH resources for separate retransmission of the CBGs to the CBGs about which the NACK is reported from the terminal. Therefore, the DL assignment DCI format having PDSCH resource assignment information for the retransmission of the CBGs may be defined to use the DL assignment DCI to include an information area for directly indicating the index information of the CBG to be retransmitted through the assigned PDSCH. In other words, when NACK is reported with regard to the M CBGs among N CBGs as shown in the above example, the BS transmits M pieces of DL assignment DCI for the retransmission of the CBGs so that M PDSCH resources can be assigned and the retransmission of each individual CBG can be performed through each PDSCH transmission.

However, when the DL assignment DCI format is configured for a certain PDSCH transmission mode, it may be defined that the retransmission mode setting information (e.g., TB-based retransmission vs. CBG-based retransmission) of the terminal is used to determine whether the DL assignment DCI format for the initial PDSCH transmission or the PDSCH retransmission includes the foregoing CBG-related direction information (e.g., the bitmap or CBG index direction information). Further, when the DL assignment DCI format is configured for a certain terminal, it is defined that the BS configures and transmits the DL assignment DCI format having the CBG-related direction information in the case of a DCI format for the terminal set to the CBG-based retransmission mode based on the retransmission mode setting information of the terminal, and configures and transmits the DL assignment DCI format having no CBG-related direction information in the case of a DCI format for the terminal set to the TB-based retransmission mode. Accordingly, when the terminal set to the CBG-based retransmission mode monitors the DL assignment DCI format, it may be defined to perform the monitoring based on the DL assignment DCI format having the CBG-related direction information. On the other hand, it may be defined that the terminal set to the TB-based retransmission mode performs monitoring based on the DL assignment DCI format having no CBG-related direction information.

Embodiment 1-2. Method of Directing CBG for Implicit Retransmission

It may be defined that a BS transmits DL assignment DCI having PDSCH resource assignment information for retransmission with regard to certain initial PDSCH transmission without including explicit direction information about a CBG to be retransmitted.

In this case, a method of configuring a CBG for certain PDSCH retransmission may be defined to configure the M CBGs required to be retransmitted among CBGs configured by the initial transmission without following a CBG configuration rule or the like determined based on the number of CBGs (i.e., a value of N set for the PDSCH transmission of the terminal) or a transmission block size (TBS). In other words, it may be defined to make only the initial PDSCH transmission obey all the CBG configuration rules defined in the NR, for example, a rule that the number of CBGs for the PDSCH according to the terminals or the number of CBs grouped into the CBG is set through the higher layer signaling, or a rule that the CBG configuration rule is defined by the TBS. In regard to the retransmission, it may be defined that the TBs to be retransmitted is configured based on the CBGs configured at the initial transmission.

Thus, when NACK is reported from a terminal with regard to the M CBGs among N CBGs configured at the foregoing initial PDSCH transmission, it may defined that the BS employs a terminal UE-transparent method to assign PDSCH resources for retransmitting the M CBGs, i.e., uses the same DCI format as DL assignment DCI for the initial PDSCH, and the terminal implicitly expects that the initial PDSCH retransmission is the PDSCH retransmission of the M CBGs about which the terminal reports NACK at the initial PDSCH transmission of the HARQ process number. Likewise, with regard to the second retransmission, the third retransmission, and the like, i.e., in the case of a certain $k^{th}$ retransmission, it may be defined that the terminal implicitly expects that the CBGs using the PDSCH for a $(k-1)^{th}$ (re)transmission are configured with CBGs about which NACK is reported.

In addition, the terminal may double check a reception error (e.g., ACK-to-NACK or NACK-to-ACK reception error) of the BS with regard to an ACK/NACK feedback of the terminal on the previous PDSCH transmission, based on CBG direction information (e.g., CBG-bitmap direction information or CBG-index direction information) directed for the retransmission in the DL assignment DCI, or the TBS directed for the retransmission in the DL assignment DCI or derived from MCS and RB assignment information.

In other words, in the former case, the CBG direction information explicitly directed in the DL assignment DCI is different from the CBG about which NACK is reported from the terminal, the terminal may determine that a HARQ ACK/NACK feedback reception error occurs in the BS. In the latter case, it may be defined that the terminal expects that the TBS directed for the retransmission in the DL assignment DCI from the BS is set as the minimum TBS not smaller than (i.e., equal to or greater than) the whole CBG size (i.e., the whole size of CBG(s) about which NACK is reported from the terminal), CBGs which are expected by the terminal to be retransmitted, or expects the TBS to be set as a function of the whole CBG size, and it may be defined that the terminal determines that a HARQ ACK/NACK feedback error occurs when the TBS directed from the BS is different from a TBS setting value expected by the terminal. Thus, it may be defined that the terminal does not transmit the HARQ ACK/NACK feedback on the retransmission (DTX) when it is determined that the error of the HARQ ACK/NACK feedback on the previous PDSCH transmission occurs in the terminal, and reports on a failure in receiving the TB to a higher layer. Further, it may be defined that the BS also determines that the HARQ ACK/NACK feedback reception error occurs in the previous PDSCH transmission when the DTX is detected in the PUSCH resource assigned for the HARQ ACK/NACK feedback of the terminal on the retransmission, and stops HARQ retransmission with regard to the TB (or CBG) of the HARQ process number.

When the CBG is configured for an error check or CBG identification, it may be defined that a CRC is scrambled based on the CBG index, and thus the terminal determines the retransmission CBG identification and the HARQ ACK/NACK feedback error in the previous PDSCH transmission.

In addition, in terms of transmitting the DL assignment DCI for the retransmission, as a method of reducing complexity of blind decoding in the terminal, a search space or control resource set for monitoring the DL assignment DCI for the retransmission may be restricted. For example, the DL assignment DCI for the retransmission may be restrictedly transmitted and received through a single mini-slot, slot or subframe (e.g., an index #(n+k)) after a predetermined period of time from a mini-slot, slot, subframe (e.g., an index #n) or the like in which the HARQ ACK/NACK feedback of the terminal is made, or the DL assignment DCI for the retransmission may be restrictedly transmitted and received through a window-based mini-slot, slot or subframes #(n+1) to #(n+k), where k may be set as an invariable constant value, or derived from a function of transmission numerology or a function of TTI length, or set through the terminal UE-specific/cell-specific higher-layer signaling.

Embodiment 2. CBC-Based Retransmission Method in UL Data Transmission

Below, a CBG-based ACK/NACK feedback method using an UL data channel, i.e., a PUSCH, and a DCI format configuration method for CBG-based PUSCH retransmission will be proposed.

In this embodiment, for convenience of description, it will be assumed that N CBGs are configured at initial PUSCH transmission with regard to a certain HARQ process number (or HARQ process ID). However, it will be appreciated that the present embodiment may be applied regardless of the number of CBGs configured at the initial PUSCH transmission, a concrete value of N or a detailed method of setting N.

Embodiment 2-1. CBG-Based PUSCH Retransmission Resource Assignment and Implicit ACK/NACK Feedback Using UL Grant without Separate ACK/NACK Feedback As described above, when TBs to be transmitted through the PUSCH include N CBGs (e.g., CBG #0, CBG #1, . . . , CBG #(N−1)) at certain initial PUSCH transmission, the BS may have to transmit HARQ ACK/NACK indication information about N CBGs transmitted from the terminal through the PUSCH and/or UL grant information for retransmission of a CBG corresponding to NACK, through a DL control channel. In this case, when NACK is generated with regard to a certain CBG, it may be defined that the BS transmits the UL grant for the retransmission of the CBG to thereby implicitly perform NACK indication about the PUSCH transmission of the terminal.

Specifically, when the M CBGs are failed to be decoded in the BS among N CBGs, which are transmitted from the terminal to the BS at a certain initial PUSCH transmission, it may be defined that the BS transmits the UL grant for the retransmission of the terminal with regard to the M CBGs and implicitly indicates HARQ ACK/NACK about the PUSCH transmission of the terminal. In this case, when the UL grant DCI format is configured to use the UL grant for directing the M CBGs failed to be decoded in the BS, it may be defined to include the explicit direction information about the CBG like the case of the PDSCH as described above in the embodiment 1. Specifically, it may be defined to include the CBG direction information by defining the UL grant DCI format for the initial PUSCH transmission and the UL grant DCI format for separate retransmission, or utilize some information areas of the existing UL grant DCI as an information area for the CBG direction. Alternatively, when the UL grant DCI format is configured, the CBG-based transmission/retransmission is taken into account to define the identical UL grant DCI formats for both the initial transmission and the retransmission, and apply the identical UL grant DCI format to both the UL grant DCI format for assigning the initial PUSCH transmission resource and the UL grant DCI format for CBG-based PUSCH retransmission.

In this case, as a method of configuring the retransmission CBG direction information, the CBG direction information may be configured with the bitmap information of the N CBGs at the initial PUSCH transmission. In other words, a certain NR BS may be defined to include a bitmap-based CBG direction information area configured with N bits when the UL grant DCI format is configured for the retransmission in accordance with N, which is the number of CBGs set for PUSCH transmission of the terminal or configured according to the PUSCH transmission. In other words, when M CBGs (M<=N) are failed to be decoded in the BS at the initial PUSCH transmission configured with N CBGs as described above, it may be defined that the BS explicitly sets the direction information about the M CBGs based on a bitmap through the UL grant DCI for the retransmission, and the BS transmits it to the terminal.

Meanwhile, in the UL grant DCI format for the retransmission, it may be defined that a bitmap configuration for the CBG direction is always based on N bits in accordance with N, which is the number of CBGs configured for the PUSCH transmission of the terminal, or a bitmap information area for the CBG direction is configured depending on the number of CBGs transmitted at the previous PUSCH (re) transmission with regard to a second retransmission, a third retransmission, and the like following a first retransmission. In other words, when L CBGs (L<=M) are failed again to be decoded in the BS among the M CBGs retransmitted at the first retransmission in the above example, it may be defined that a bitmap for configuring the CBG direction information of the DL assignment DCI for retransmitting the L CBGs is configured with M bits corresponding to the value of M, i.e., the number of CBGs transmitted at the previous PDSCH retransmission.

However, in terms of configuring a certain UL grant DCI format, the UL grant DCI format for assigning the PUSCH resources at the initial PUSCH transmission and the UL grant DCI format for assigning the PUSCH resources at the CBG-based retransmission may be identically defined in accordance with N, which is the number of CBGs defined for the PUSCH transmission of the terminal. In this case, the bitmap information area configured with N bits corresponding to N, which is the number of CBGs, is included in not only the UL grant DCI format including the PUSCH resource assignment information for the CBG-based retransmission but also the UL grant DCI format for assigning the initial PUSCH transmission resources. In this case, to assign the resources for the initial PDSCH transmission, it may be defined that the BS sets and transmits a bitmap information area of N bits having the UL grant DCI format for the resource assignment into a specific value (e.g., all of 'zero' or all of '1').

As still another method of identically defining the UL grant DCI format for the initial PUSCH transmission and the UL grant DCI format for the retransmission, it may be defined that the size of the CBG direction information area of the UL grant of a certain terminal (i.e., the number of bits (or a Q value)) is set in the bitmap information area for the CBG direction when the CBG-based (re)transmission is set with regard to the PUSCH for the certain terminal in the BS/network, and then transmitted to the terminal through a terminal or UE-specific or cell-specific higher layer signaling, and it may be defined that the terminal always receives the UL grant including the CBG direction information area configured with a bitmap of Q bits regardless of the initial PDSCH transmission or the retransmission with regard to a certain HARQ process number.

Like this, when the CBG-based PUSCH (re)transmission is set with regard to the PDSCH of the certain terminal, and the size of the CBG direction information area of the UL grant for the terminal is set by the BS/network through the terminal UE-specific or cell-specific higher-layer signaling, N, which is the number of CBGs configuring the TB transmitted through a certain PUSCH for the terminal, may be directed through the CBG direction information area included in the UL grant of transmitting the resource assignment information for the initial PUSCH transmission. In other words, unlike the method where the size of bitmap for the CBG direction included in the UL grant for the terminal is determined in accordance with the already determined number of CBGs (i.e., the value of N as described above), it may be determined that the bitmap size, i.e., the Q value of the CBG direction information area to be included in the UL grant is set through the terminal UE-specific or cell-specific higher-layer signaling in the BS/network, and it may be determined that the number of CBGs or N CBGs configuring the TB transmitted through the PUSCH, i.e., certain PDSCH transmission for the terminal is set through the bitmap information area for the CBG direction of the UL grant for the initial PUSCH transmission.

Specifically, as a mapping method between the CBGs configuring the TB transmitted through a certain PUSCH and a bitmap configuring the CBG direction information area included in the UL grant having the PUSCH (re)transmitting resource assignment information, it may be defined that the CBG configuring the TB from the lowest CBG index is sequentially one-to-one mapped to the bitmap configuring the CBG direction information area from the least significant bit (LSB) to the most significant bit (MSB).

Further, when a bitmap configuring the CBG direction information area of the UL grant is set in the BS/network, it may be defined that the CBG transmitted through the PUSCH assigned by the UL grant is indicated as '1' but the CBG not transmitted is indicated as '0'. In this case, in terms of setting the bitmap configuring the CBG direction information area of the UL grant for assigning the initial PUSCH transmission resource to a certain TB (i.e., the UL grant for the initial PUSCH transmission with regard to a certain HARQ process number), when the number of CBGs for the TB is desired to be directed to N in the BS/network, it may be defined that successive N bits from the LSB of the CBG direction bitmap are set to '1' and the other bits are set to '0'. Therefore, it may be defined that the TBs transmitted through the initial PUSCH transmission of the HARQ process may be numbered into N CBGs of CBG #0 to CBG #(N−1).

On the other hand, as a mapping method between the CBG configuring the TB transmitted through a certain PUSCH and the CBG direction bitmap included in the UL grant, it may be defined that the CBG configuring the TB from the lowest CBG index is sequentially one-to-one mapped to the bitmap configuring the CBG direction information area from the MSB to the LSB. In this case, in terms of setting the bitmap configuring the CBG direction information area of the UL grant for assigning the initial PUSCH transmission resource to a certain TB (i.e., the UL grant for the initial PUSCH transmission with regard to a certain HARQ process number), when the number of CBGs for the TB is desired to be directed to N in the BS/network, it may be defined that successive N bits from the MSB of the CBG direction bitmap are set to '1' and the other bits are set to '0'. Therefore, it may be defined that the TBs transmitted through the initial PUSCH transmission of the HARQ process may be numbered into N CBGs of CBG #0 to CBG #(N−1).

For example, when the size of the bitmap for the CBG direction is set to Q bits through the foregoing terminal UE-specific or cell-specific higher-layer signaling, it may be defined that the number of CBGs configuring the TB, i.e., the value of N (where, N≤Q) is determined in accordance with the number of bits successively set to '1' from the LSB or MSB in the bitmap of Q bits for directing the CBG included in the UL grant for assigning the resources of the initial PUSCH transmission for the terminal.

On the other hand, in terms of setting the bitmap configuring the CBG direction information area of the UL grant in the BS/network, when it is defined that the CBG transmitted through the PUSCH assigned by the UL grant is indicated with '0' and the CBG not transmitted is indicated with 1', it may be defined that the number of CBGs configuring the TB, i.e., the value of N (where, N<=Q) is determined in accordance with the number of bits successively set to '0' from the LSB or MSB in the bitmap of Q bits for directing the CBG included in the UL grant for assigning the resources of the initial PUSCH transmission for the terminal. In this case, when the CBG-based PUSCH retransmission is directed with regard to the TB, i.e., when the UL grant of directing the retransmission of the TB is transmitted by the BS/network, it may be defined that only successive N bits from the LSB or MSB of the CBG direction bitmap based on N, which is the number of CBGs configuring the TB directed at the initial PUSCH transmission, are analyzed as significant retransmission CBG direction information in terms of analyzing the CBG direction bitmap information area of Q bits included in the UL grant by the terminal.

Further, it may be defined that the retransmission is performed by separate PUSCH assignment according to the CBGs. In other words, when the retransmission is required for the M CBGs among N CBGs configured through the initial PUSCH transmission, the PUSCH resource assignment may be separately performed for the retransmission corresponding to each individual CBG.

In this case, it may be defined that the UL grant DCI for the retransmission corresponding to each individual CBG includes direction information about a single CBG to be retransmitted through the PUSCH assigned by the UL grant DCI. The CBG direction information may be CBG index information corresponding to the number of CBGs configured through the initial PUSCH transmission. In other words, when the initial PUSCH transmission involves N CBGs with regard to the certain HARQ process number of the foregoing example, each CBG may be indexed with CBG #0 to #(N−1), and thus the BS assigns the PUSCH resources for separate retransmission of the CBGs to the CBGs failed to be decoded in the BS. Therefore, the UL grant DCI format having PUSCH resource assignment information for the retransmission of the CBGs may be defined to use the UL grant DCI to include an information area for directly indicating the index information of the CBG to be retransmitted through the assigned PUSCH. In other words, when the M CBGs are failed to be decoded among N CBGs as shown in the above example, the BS transmits M pieces of UL grant DCIs for the retransmission of the CBGs so that M PUSCH resources can be assigned and the retransmission of each individual CBG can be performed through each PUSCH transmission.

However, when the UL grant DCI format is configured for a certain PUSCH transmission mode, it may be defined that the retransmission mode setting information (e.g., TB-based retransmission vs. CBG-based retransmission) of the terminal is used to determine whether the UL grant DCI format for the initial PUSCH transmission or the PUSCH retransmission includes the foregoing CBG-related direction information (e.g., the bitmap or CBG index direction information). Further, when the UL grant DCI format is configured for a certain terminal, it may be defined that the BS configures and transmits the UL grant DCI format having the CBG-related direction information in the case of a DCI format for the terminal set to the CBG-based retransmission mode based on the retransmission mode setting information of the terminal, and configures and transmits the UL grant DCI format having no CBG-related direction information in the case of a DCI format for the terminal set to the TB-based retransmission mode. In regard to the terminal, when the terminal set to the CBG-based retransmission mode monitors the UL grant DCI format, it may be defined to perform the monitoring based on the UL grant DCI format having the CBG-related direction information. On the other hand, it may be defined that the terminal set to the TB-based retransmission mode performs monitoring based on the UL grant DCI format having no CBG-related direction information.

In addition, in terms of transmitting the UL grant DCI for the retransmission, as a method of reducing complexity of blind decoding in the terminal, a search space or control resource set for monitoring the UL grant DCI for the retransmission may be restricted. For example, the UL grant DCI for the retransmission may be restrictedly transmitted and received through a single mini-slot, slot or subframe (e.g., an index #(n+k)) after a predetermined period of time from a mini-slot, slot, subframe (e.g., an index #n) in which the previous PUSCH transmission of the terminal is made with regard to the HARQ process number or from a mini-slot, slot, subframe (e.g., an index #n) where the UL grant DCI is transmitted from the BS, or the UL grant DCI for the retransmission may be restrictedly transmitted and received through a window-based mini-slot, slot or subframes #(n+1) to #(n+k), where k may be set as an invariable constant value, or derived from a function of transmission numerology or a function of TTI length, or set through the terminal UE-specific/cell-specific higher-layer signaling.

Figure 2:
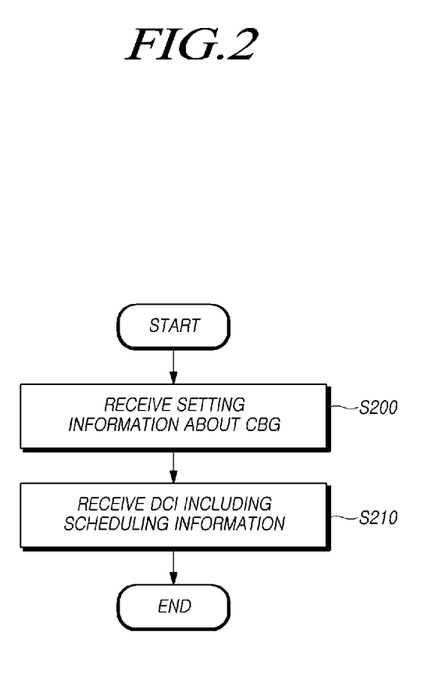
FIG. 2 illustrates a method of transmitting and receiving a data channel in a terminal according to one embodiment.

FIG. 2 illustrates a method of a terminal for transmitting and receiving a data channel according to one embodiment.

Referring to FIG. 2, the terminal may receive setting information about a CBG for retransmission of the data channel from a BS (S200). In this case, the setting information about the CBG may include information for directing a maximum number of CBGs per transmission block. Further, the terminal may receive the information for directing the maximum number of CBGs per transmission block from the BS through higher layer signaling (e.g., RRC signaling).

Further, the terminal may receive DCI including scheduling information about the data channel from the BS (S210). In this case, the DCI may include the transmission direction information about the CBG for the retransmission of the data channel.

The transmission direction information about the CBG may be directed by a bitmap configured with as many bits as the maximum number of CBGs per transmission block, as information included in the setting information about the CBGs received in operation S200. For example, the maximum number of CBGs per transmission block may be determined as one number from among 2, 4, 6 and 8, and thus the number of bits in the bitmap may be also determined as one number from among 2, 4, 6 and 8.

In this case, as an example of the method of setting each bit in the bitmap configuring the transmission direction information about the CBG, each bit in the bitmap is set to '1' when the CBG directed by the corresponding bit is transmitted through the data channel, but set to '0' when the CBG directed by each bit is not transmitted through the data channel.

Further, the DCI may additionally include flushing direction information about the CBG for the retransmission of the data channel. As an example of directing the flushing direction information, the flushing direction information may be directed with 1 bit. Further, it may be defined that the flushing direction information of 1 bit is set to '0' when data stored in a soft buffer of the terminal corresponding to the CBG is valid, but set to '1' when the data is invalid in a case where retransmission of a certain CBG is directed through the foregoing CBG-based DL assignment DCI format (that is, when a bit for directing the CBG has a value of '1' in the transmission direction information about the CBG), thereby determining whether to combine the data stored in the soft buffer and the retransmitted data while the terminal decodes the data of the CBG to be retransmitted.

Figure 3:
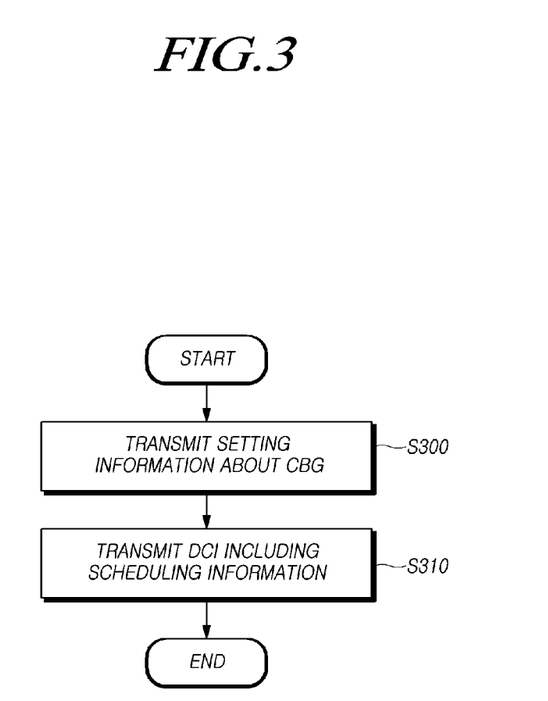
FIG. 3 illustrates a method of transmitting and receiving a data channel in a base station according to one embodiment.

FIG. 3 illustrates a method of a BS for transmitting and receiving a data channel according to one embodiment.

Referring to FIG. 3, the BS may transmit setting information about a CBG for retransmission of a data channel to a terminal (S300). In this case, the setting information about the CBG may include information for directing the maximum number of CBGs per transmission block. Further, the BS may transmit the information for directing the maximum number of CBGs per transmission block to the terminal through higher layer signaling (e.g., RRC signaling).

Further, the BS may transmit DCI including scheduling information about a data channel to the terminal (S310). In this case, the DCI may include the transmission direction information about the CBG for the retransmission of the data channel.

The foregoing transmission direction information about the CBG may be directed by a bitmap configured with as many bits as the maximum number of CBGs per transmission block, as information included in the setting information about the CBGs transmitted in operation S300. For example, the maximum number of CBGs per transmission block may be determined as one number of 2, 4, 6 and 8, and thus the number of bits in the bitmap may be also determined as one number of 2, 4, 6 and 8.

In this case, as an example of the method of setting each bit in the bitmap configuring the transmission direction information about the CBG, each bit in the bitmap is set to '1' when the CBG directed by the corresponding bit is transmitted through the foregoing data channel, but set to '0' when the CBG directed by each bit is not transmitted through the foregoing data channel.

Further, the DCI may additionally include flushing direction information about the CBG for the retransmission of the data channel. As an example of directing the flushing direction information, the flushing direction information may be directed with 1 bit. Further, it may be defined that the flushing direction information of 1 bit is set to '0' when data stored in a soft buffer of the terminal corresponding to the CBG is valid, but set to '1' when the data is invalid in a case where retransmission of a certain CBG is directed through the foregoing CBG-based DL assignment DCI format (that is, when a bit for directing the CBG has a value of '1' in the transmission direction information about the CBG), thereby determining whether to combine the data stored in the soft buffer and the retransmitted data while the terminal decodes the data of the CBG to be retransmitted.

Figure 4:
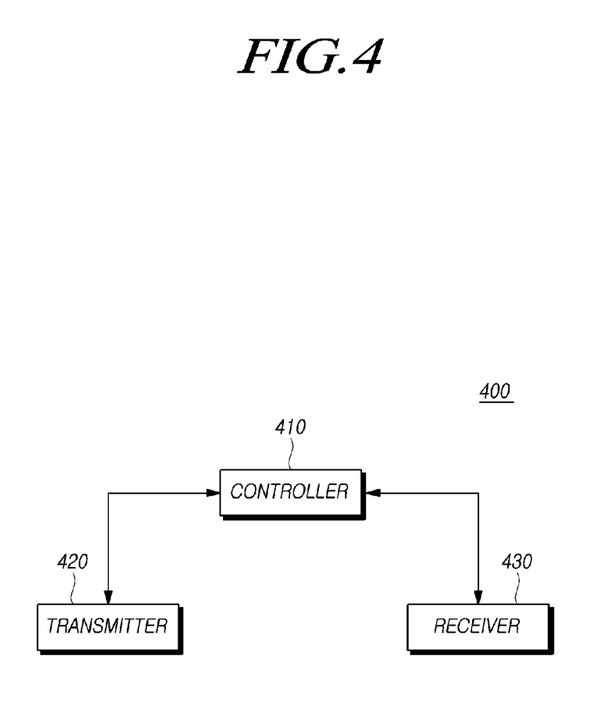
FIG. 4 illustrates a base station according to at least one of embodiments.

FIG. 4 illustrates a BS according to at least one of the embodiments.

Referring to FIG. 4, a BS 400 includes a controller 410, a transmitter 420, and a receiver 430.

The controller 410 may control general operations of the BS to transmit and receive a data channel.

The transmitter 420 and the receiver 430 may be used in transmitting and receiving a signal, a message and data, which are needed to materialize the present disclosure, to and from a terminal.

Specifically, the transmitter 420 may transmit setting information about a CBG for retransmission of the data channel to the terminal, and the transmitter 420 transmits DCI including scheduling information about the data channel to the terminal.

In this case, as described above, the setting information about a CBG may include information for directing a maximum number of CBGs per transmission block, and the BS may transmit the information for directing the maximum number of CBGs per transmission block to the terminal through higher layer signaling (e.g., RRC signaling). Further, the DCI may include the transmission direction information about the CBG for the retransmission of the data channel.

The transmission direction information about the CBG may be directed by a bitmap configured with as many bits as the maximum number of CBGs per transmission block, as information included in the setting information about the transmitted CBGs. For example, the maximum number of CBGs per transmission block may be determined as one number from among 2, 4, 6 and 8, and thus the number of bits in the bitmap may be also determined as one number from among 2, 4, 6 and 8.

In this case, as an example of the method of setting each bit in the bitmap configuring the transmission direction information about the CBG, each bit in the bitmap is set to '1' when the CBG directed by the corresponding bit is transmitted through the data channel, but set to '0' when the CBG directed by each bit is not transmitted through the data channel.

Further, the DCI may additionally include flushing direction information about the CBG for the retransmission of the data channel. As an example of directing the flushing direction information, the flushing direction information may be directed with 1 bit. Further, it may be defined that the flushing direction information of 1 bit is set to '0' when data stored in a soft buffer of the terminal corresponding to the CBG is valid, but set to '1' when the data is invalid in a case where retransmission of a certain CBG is directed through the foregoing CBG-based DL assignment DCI format (that is, when a bit for directing the CBG has a value of '1' in the transmission direction information about the CBG), thereby determining whether to combine the data stored in the soft buffer and the retransmitted data while the terminal decodes the data of the CBG to be retransmitted.

Figure 5:
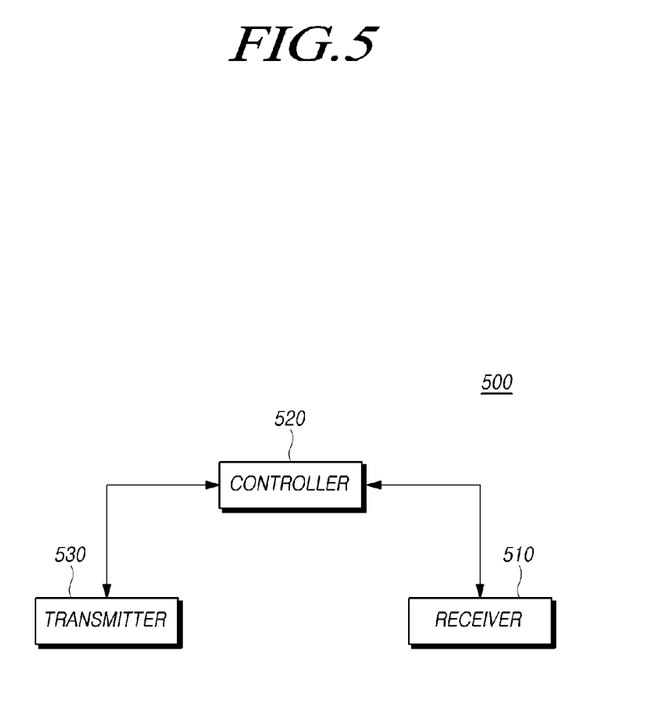
FIG. 5 illustrates a terminal according to at least one of embodiments.

FIG. 5 illustrates a terminal according to at least one of the embodiments.

Referring to FIG. 5, a terminal 500 includes a receiver 510, a controller 520, and a transmitter 530.

The receiver 510 may receive setting information about a CBG for retransmission of a data channel from a BS, and the receiver 510 may receive DCI including scheduling information about the data channel from the BS.

In this case, as described above, the setting information about a CBG may include information for directing a maximum number of CBGs per transmission block. Further, the terminal may receive the information for directing the maximum number of CBGs per transmission block from the BS through higher layer signaling (e.g., RRC signaling). Further, the DCI may include the transmission direction information about the CBG for the retransmission of the data channel.

The foregoing transmission direction information about the CBG may be directed by a bitmap configured with as many bits as the maximum number of CBGs per transmission block, as information included in the setting information about the CBGs received in operation S200. For example, the maximum number of CBGs per transmission block may be determined as one number of 2, 4, 6 and 8, and thus the number of bits in the bitmap may be also determined as one number of 2, 4, 6 and 8.

In this case, as an example of the method of setting each bit in the bitmap configuring the transmission direction information about the CBG, each bit in the bitmap is set to '1' when the CBG directed by the corresponding bit is transmitted through the foregoing data channel, but set to '0' when the CBG directed by each bit is not transmitted through the foregoing data channel.

Further, the DCI may additionally include flushing direction information about the CBG for the retransmission of the data channel. As an example of directing the flushing direction information, the flushing direction information may be directed with 1 bit. Further, it may be defined that the flushing direction information of 1 bit is set to '0' when data stored in a soft buffer of the terminal corresponding to the CBG is valid, but set to '1' when the data is invalid in a case where retransmission of a certain CBG is directed through the foregoing CBG-based DL assignment DCI format (that is, when a bit for directing the CBG has a value of '1' in the transmission direction information about the CBG), thereby determining whether to combine the data stored in the soft buffer and the retransmitted data while the terminal decodes the data of the CBG to be retransmitted.

According to the foregoing embodiments, there is provided a CBG-based retransmission method of transmitting and receiving the data channel, i.e., PDSCH/PUSCH, for the next-generation/5G radio access network.

The standard details or standard documents described in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the present disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of transmitting and receiving a data channel by a terminal, the method comprising:
    receiving setting information about a code block group (CBG) for retransmission of the data channel from a base station; and
    receiving downlink control information (DCI) comprising scheduling information about the data channel from the base station,
    wherein the DCI comprises transmission direction information about the CBG,
    wherein the DCI further comprises flushing direction information of one bit for indicating validity of data stored in a soft buffer of the terminal corresponding to the CBG to be retransmitted,
    wherein the flushing direction information is set to zero when the stored data is valid, and the flushing direction information is set to one when the stored data is invalid,
    wherein the flushing direction information included in the DCI is used to determine whether to combine the data stored in the soft buffer of the terminal and data retransmitted from the base station for decoding,
    wherein the setting information about the CBG comprises information for directing a maximum number of CBGs per transmission block (TB),
    wherein a number of bits in the transmission direction information about the CBG corresponds to the maximum number of CBGs per TB, and
    wherein each bit in the transmission direction information about the CBG indicates whether or not the CBG is transmitted through the data channel.

2. The method according to claim 1, wherein the setting information about the CBG is received from the base station through higher layer signaling.

3. The method according to claim 1, wherein the transmission direction information about the CBG is directed by a bitmap configured with the number of bits corresponding to the maximum number of CBGs per TB.

4. The method according to claim 3, wherein the number of bits in the bitmap is determined as one number of 2, 4, 6 and 8.

5. The method according to claim 3, wherein each bit of the bitmap is set to 1 when the CBG directed by each bit is transmitted through the data channel, and each bit of the bitmap is set to zero when the CBG directed by each bit is not transmitted through the data channel.

6. A method of transmitting and receiving a data channel by a base station, the method comprising:
    transmitting setting information about a code block group (CBG) for retransmission of the data channel to a terminal; and
    transmitting downlink control information (DCI) comprising scheduling information about the data channel to the terminal,
    wherein the DCI comprises transmission direction information about the CBG,
    wherein the DCI further comprises flushing direction information of one bit for indicating validity of data stored in a soft buffer of the terminal corresponding to the CBG to be retransmitted,
    wherein the flushing direction information is set to zero when the data is valid, and the flushing direction information is set to one when the data is invalid,
    wherein the flushing direction information included in the DCI is used to determine whether to combine the data stored in the soft buffer of the terminal and data retransmitted from the base station for decoding,
    wherein the setting information about the CBG comprises information for directing a maximum number of CBGs per transmission block (TB),
    wherein a number of bits in the transmission direction information about the CBG corresponds to the maximum number of CBGs per TB, and
    wherein each bit in the transmission direction information about the CGB indicates whether or not the CBG is transmitted through the data channel.

7. The method according to claim 6, wherein the setting information about the CBG is transmitted to the terminal through higher layer signaling.

8. The method according to claim 6, wherein the transmission direction information about the CBG is directed by a bitmap configured with the number of bits corresponding to the maximum number of CBGs per TB.

9. The method according to claim 8, wherein the number of bits in the bitmap is determined as one number of 2, 4, 6 and 8.

10. The method according to claim 8, wherein each bit of the bitmap is set to 1 when the CBG directed by each bit is transmitted through the data channel, and each bit of the bitmap is set to zero when the CBG directed by each bit is not transmitted through the data channel.

11. A terminal for transmitting and receiving a data channel, the terminal comprising:
    a receiver configured to receive setting information about a code block group (CBG) for retransmission of the data channel from a base station, and receive downlink control information (DCI) comprising scheduling information about the data channel from the base station,
    wherein the DCI comprises transmission direction information about the CBG,
    wherein the DCI further comprises flushing direction information of one bit for indicating validity of data stored in a soft buffer of the terminal corresponding to the CBG to be retransmitted,
    wherein the flushing direction information is set to zero when the data is valid, and the flushing direction information is set to one when the data is invalid,
    wherein the flushing direction information included in the DCI is used to determine whether to combine the data stored in the soft buffer of the terminal and data retransmitted from the base station for decoding, wherein the setting information about the CBG comprises information for directing a maximum number of CBGs per transmission block (TB), wherein a number of bits in the transmission direction information about the CBG corresponds to the maximum number of CBGs per TB, and wherein each bit in the transmission direction information about the CBG indicates whether or not the CBG is transmitted through the data channel.

12. The terminal according to claim 11, wherein the setting information about the CBG is received from the base station through higher layer signaling.

13. The terminal according to claim 11, wherein the transmission direction information about the CBG is directed by a bitmap configured with the number of bits corresponding to the maximum number of CBGs per TB.

* * * * *